United States Patent
Kim et al.

(10) Patent No.: US 9,449,444 B2
(45) Date of Patent: Sep. 20, 2016

(54) DOOR LOCK APPARATUS, DISPLAY APPARATUS, MOBILE DEVICE, AND METHOD FOR CONTROLLING THEREOF

(71) Applicant: SAMSUNG ELECTRONICS CO., LTD., Suwon-si (KR)

(72) Inventors: Tae-hoon Kim, Suwon-si (KR); Kun-sok Kang, Yongin-si (KR); Tae-hyeun Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 21 days.

(21) Appl. No.: 14/511,867

(22) Filed: Oct. 10, 2014

(65) Prior Publication Data
US 2015/0102899 A1     Apr. 16, 2015

(30) Foreign Application Priority Data
Oct. 11, 2013 (KR) .................. 10-2013-0121380

(51) Int. Cl.
| | | |
|---|---|---|
| G07C 9/00 | (2006.01) | |
| H04L 12/28 | (2006.01) | |
| H04L 29/06 | (2006.01) | |
| H04W 4/00 | (2009.01) | |
| H04W 12/06 | (2009.01) | |
| G05B 1/01 | (2006.01) | |
| G08C 17/04 | (2006.01) | |
| G08C 17/06 | (2006.01) | |

(52) U.S. Cl.
CPC ............ G07C 9/00103 (2013.01); G05B 1/01 (2013.01); G07C 9/00015 (2013.01); G07C 9/00166 (2013.01); G07C 9/00309 (2013.01); G07C 9/00904 (2013.01); G08C 17/04 (2013.01); G08C 17/06 (2013.01); H04L 12/282 (2013.01); H04L 12/2823 (2013.01); (Continued)

(58) Field of Classification Search
CPC  G07C 9/00; G07C 9/00166; G07C 9/00896; G07C 9/00039; G07C 9/00007; G06K 7/10; G08G 1/017
USPC .............. 340/5.2–5.7, 5.51, 5.28, 5.31, 5.72, 340/541, 5.67, 5.64, 540, 5.52, 5.21, 5.61, 340/5.54, 5.62–5.63, 5.65
See application file for complete search history.

(56) References Cited

U.S. PATENT DOCUMENTS

| | | | |
|---|---|---|---|
| 8,502,780 B1 * | 8/2013 | Park ................... | G06F 3/04886 345/165 |
| 2007/0197236 A1 | 8/2007 | Ahn et al. | |

(Continued)

FOREIGN PATENT DOCUMENTS

| | | |
|---|---|---|
| EP | 1233602 A1 | 8/2002 |
| EP | 1536087 A1 | 6/2005 |

(Continued)

OTHER PUBLICATIONS

Communication issued on Feb. 11, 2015 by the European Patent Office in related Application No. 14187965.0.

*Primary Examiner* — Allen T Cao
(74) *Attorney, Agent, or Firm* — Sughrue Mion, PLLC

(57) ABSTRACT

A door lock apparatus is provided. The door lock apparatus includes a first interface configured to communicate with a plurality of external apparatuses; a near field communicator configured to perform authentication for opening a door; a second interface configured to communicate with a display apparatus; and a controller configured to control the first interface to receive status information on each of the plurality of external apparatuses from the plurality of external apparatuses, control the second interface to transmit the received status information to the display apparatus to be displayed in response to the authentication being performed by the near field communicator.

24 Claims, 15 Drawing Sheets

(52) U.S. Cl.
CPC .......... *H04L 63/08* (2013.01); *H04L 63/0853* (2013.01); *H04W 4/008* (2013.01); *H04W 12/06* (2013.01); *H04L 2012/2841* (2013.01)

(56) References Cited

U.S. PATENT DOCUMENTS

| | | | | |
|---|---|---|---|---|
| 2007/0216764 | A1* | 9/2007 | Kwak | H04L 12/64 348/14.06 |
| 2010/0087241 | A1* | 4/2010 | Nguyen | G07F 17/3218 463/17 |
| 2012/0078091 | A1* | 3/2012 | Suchecki | A61M 5/007 600/431 |
| 2013/0138265 | A1* | 5/2013 | Kim | H04L 67/12 701/1 |
| 2015/0243122 | A1* | 8/2015 | Saffari | G07F 17/329 463/17 |

FOREIGN PATENT DOCUMENTS

| | | |
|---|---|---|
| EP | 1806703 A2 | 7/2007 |
| WO | 0133900 A1 | 5/2001 |

* cited by examiner

DOOR LOCK APPARATUS, DISPLAY APPARATUS, MOBILE DEVICE, AND METHOD FOR CONTROLLING THEREOF

CROSS-REFERENCE TO RELATED APPLICATIONS

This application claims priority from Korean Patent Application No. 10-2013-0121380, filed on Oct. 11, 2013 in the Korean Intellectual Property Office, the disclosure of which is incorporated herein by reference in its entirety.

BACKGROUND

1. Field

Apparatuses and methods consistent with exemplary embodiments generally relate to a door lock apparatus, a display apparatus, a mobile device, and methods for controlling thereof, and more particularly, to a door lock apparatus, a display apparatus, and a mobile device, which transmit or receive status information and methods for controlling thereof.

2. Description of the Related Art

With the improvement of home networking technologies, many household electronic apparatuses are capable of communicating with each other. Thus, a user is able to check or control a status of electronic apparatuses within a house even when the user is not in the house.

However, such a home networking system is based on a wireless communication system, and thus, has problems such as delay in communication or ineffective information transmission. Further, the home networking system performs certain functions which are predetermined in advance only regardless of a location of the user. Thus, there is a need for more efficiently checking the status of the electronic apparatuses in a house. In addition, there is also a need for checking the status of external apparatuses which are disposed outside of the house when a user is in a house.

SUMMARY

Exemplary embodiments provide a door lock apparatus, a display apparatus, and a mobile device, which transmit or receive status information about a plurality of external apparatuses when authentication for opening a door is performed, and methods for controlling thereof.

According to an aspect of an exemplary embodiment, there is provided a door lock apparatus including a first interface configured to communicate with a plurality of external apparatuses; a near field communicator configured to perform authentication for opening a door; a second interface configured to communicate with a display apparatus; and a controller configured to control the first interface to receive status information on each of the plurality of external apparatuses from the plurality of external apparatuses, control the second interface to transmit the received status information to the display apparatus to be displayed in response to the authentication being performed by the near field communicator.

The near field communication unit may perform the authentication by performing near field communication with a mobile device and recognizing a tag within the mobile device.

The display apparatus may be the mobile device.

The door lock apparatus may further include a plurality of keys. In response to an authentication number being input through the plurality of keys, the near field communication unit may perform the authentication by comparing the input authentication number and a pre-stored authentication number.

The plurality of external apparatuses may include at least one of a first external apparatus which is disposed in an external environment of a space defined by a door to which the door lock apparatus is mounted and a second external apparatus which is disposed in an internal environment of the space. In addition, the display apparatus may be an apparatus which is disposed in the internal environment of the space.

In response to the authentication being performed, the controller may request the status information from each of the plurality of external apparatuses, and receive the status information.

The door lock apparatus may further include a storage configured to store the status information. In addition, the controller may receive the status information from the plurality of external apparatuses at a predetermined time interval, and store the received status information in the storage.

The plurality of external apparatuses may include at least one of a car, an electricity meter, a sprinkler, an air-conditioning and heating system, and a home appliance. In addition, the status information may be information which represents at least one of a car status, a measured electricity consumption amount, an operating status of the sprinkler, an operating status of the air-conditioning and heating system, and an operating status of the home appliance.

According to an aspect of another exemplary embodiment, there is provided a display apparatus disposed within a space defined by a door lock apparatus, the display apparatus including a display, a receiver configured to receive status information on each of a plurality of external apparatuses, and a controller configured to, in response to authentication for opening a door being performed in the door lock apparatus, control to display the received status information on the display.

According to an aspect of another exemplary embodiment, there is provided a mobile device including a display, a near field communication unit configured to perform authentication in response to being tagged with a door lock apparatus, a communication unit configured to receive status information on each of a plurality of external apparatuses from the door lock apparatus in response to the authentication being performed, and a controller configured to control the display to display the status information in response to the status information being received.

According to an aspect of another exemplary embodiment, there is provided a method for controlling a door lock apparatus, the method including performing authentication for opening a door, receiving status information on each of a plurality of external apparatuses from the plurality of external apparatuses in response to the authentication being performed, and transmitting the status information received from each of the plurality of external apparatuses to a display to be displayed.

The performing authentication may include performing the authentication by performing near field communication with a mobile device and recognizing a tag within the mobile device.

The display apparatus may be part of the mobile device.

In response to an authentication number being input through a plurality of keys which are mounted on the door lock apparatus, the performing authentication may include performing the authentication by comparing the input authentication number and a pre-stored authentication number.

The plurality of external apparatuses may include at least one of a first external apparatus which is disposed in an external environment of a space defined by a door to which the door lock apparatus is mounted and a second external apparatus which is disposed in an internal environment of the space. In addition, the display apparatus may be an apparatus which is disposed in the internal environment of the space.

In response to the authentication being performed, the receiving status information on each of a plurality of external apparatuses from the plurality of external apparatuses may include requesting for the status information to each of the plurality of external apparatuses and receiving the status information.

In addition, the method may further include receiving the status information from the plurality of external apparatuses at a predetermined time interval and storing the status information.

The plurality of external apparatuses may include at least one of a car, an electricity meter, a sprinkler, an air-conditioning and heating system, and a home appliance. In addition, the status information may be information which represents at least one of a car status, a measured electricity consumption amount, an operating status of the sprinkler, an operating status of the air-conditioning and heating system, and an operating status of the home appliance.

According to an aspect of another exemplary embodiment, there is provided a method for controlling a display apparatus disposed within a space defined by a door lock apparatus, the method including receiving status information on each of a plurality of external apparatuses in response to authentication for opening a door being performed in the door lock apparatus and displaying the received status information.

According to an aspect of another exemplary embodiment, there is provided a method for controlling a mobile device, the method including performing authentication in response to being tagged with a door lock apparatus, receiving status information on each of a plurality of external apparatuses from the door lock apparatus in response to the authentication being performed, and displaying the status information in response to the status information being received.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Figure 1:
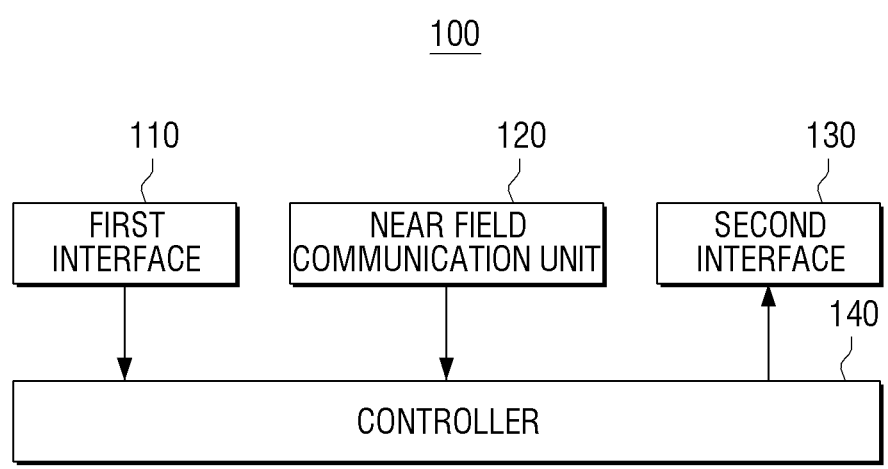
FIG. 1 is a block diagram illustrating a structure of a door lock apparatus according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating a structure of a door lock apparatus according to an exemplary embodiment.

According to FIG. 1, a door lock apparatus 100 may include a first interface 110, a near field communication unit 120 (e.g., a near field communicator), a second interface 130, and a controller 140.

The door lock apparatus 100 refers to an apparatus which opens and closes a sliding door, a hinged door and the like automatically by an opening and closing mechanism, performs authentication by using various means such as an electronic card, fingerprint recognition, iris recognition, authentication number input, and the like, and automatically opens and closes a door when the authentication is performed.

The door lock apparatus 100 is disposed on both sides of an entrance door, and thus, the door lock apparatus 100 according to an exemplary embodiment may perform a function of a relay station for relaying communication between devices that are outside and inside of a house.

The first interface 110 may communicate with a plurality of external apparatuses. To be specific, in order to communicate with a plurality of external apparatuses, the first interface 110 may communicate with various external apparatuses (for example, another apparatus or server), which are connected to a network, by using a network address allocated to the door lock apparatus 100.

In addition, the first interface 110 may perform network communication by using various communication methods. To be specific, the first interface 110 may perform network communication by using various communication methods such as a wired/wireless Local Area Network (LAN), Wi-Fi, a Wide Area Network (WAN), Ethernet, Bluetooth, Zigbee, a Universal Serial Bus (USB), IEEE 1394, etc. The first interface 110 may be equipped with various communication modules for performing the network communication according to each communication method.

For example, when communication is to be performed by a wired LAN method, the first interface 110 may be equipped with a wired LAN card, and when communication is to be performed by a Wi-Fi method, the first interface 110 may be equipped with a Wi-Fi communication chip.

The near field communication unit 120 may perform authentication for opening a door.

Herein, the near field communication unit 120 may perform the authentication by performing near field communication with a mobile device (not shown) and recognizing a tag within the mobile device.

For example, the near field communication unit 120 may use a Near Field Communication (NFC) method in order to perform the near field communication with a mobile device (not shown). The NFC method may use one of Radio Frequency Identification (RFID) technologies, and may be a non-contact type communication technology which may use a frequency band of 13.56 MHz. The NFC method is a next-generation communication technology which receives attention due to its high security level and inexpensive costs based on its short communication distance.

In particular, the NFC method is capable of using both of a function of reading data and a function of writing data, and thus, does not require a dongle (a reader) which was needed to use the RFID technology. In addition, the NFC method is similar to the existing near field communication methods such as a Bluetooth method, etc., but is not required to establish a particular setting between devices, unlike the Bluetooth method.

Accordingly, the near field communication unit 120 may be provided with an NFC chip, and when a mobile device including other NFC chip or an NFC card is located within a predetermined range of the near field communication unit 120, may perform authentication by exchanging data with the mobile device.

The second interface 130 may communicate with a display apparatus. Herein, the display apparatus (not shown) may be implemented as various types of electronic apparatus such as a television (TV), a smart phone, a tablet personal computer (PC), a desktop PC, a laptop PC, etc.

In addition, as described above in connection with the first interface 110, the second interface 130 may perform the network communication by using various communication methods. Thus, redundant descriptions will be omitted.

When authentication is performed, the controller 140 may control to receive status information on each of a plurality of external apparatuses from the plurality of external apparatuses, transmit the received status information to a display apparatus, and display the transmitted status information.

In particular, when the authentication for opening a door is performed by the near field communication unit 120, the controller 140 may control the first interface 110 to receive the status information on each of the plurality of external apparatuses by communicating with the plurality of external apparatuses, and may control the second interface 120 to transmit the received status information to the display apparatus to be displayed.

Accordingly, in order to control the display apparatus to display the received status information, the controller 140 may add and transmit a control signal for displaying the received status information on the display apparatus to the received status information as a form of meta data.

Figure 2:
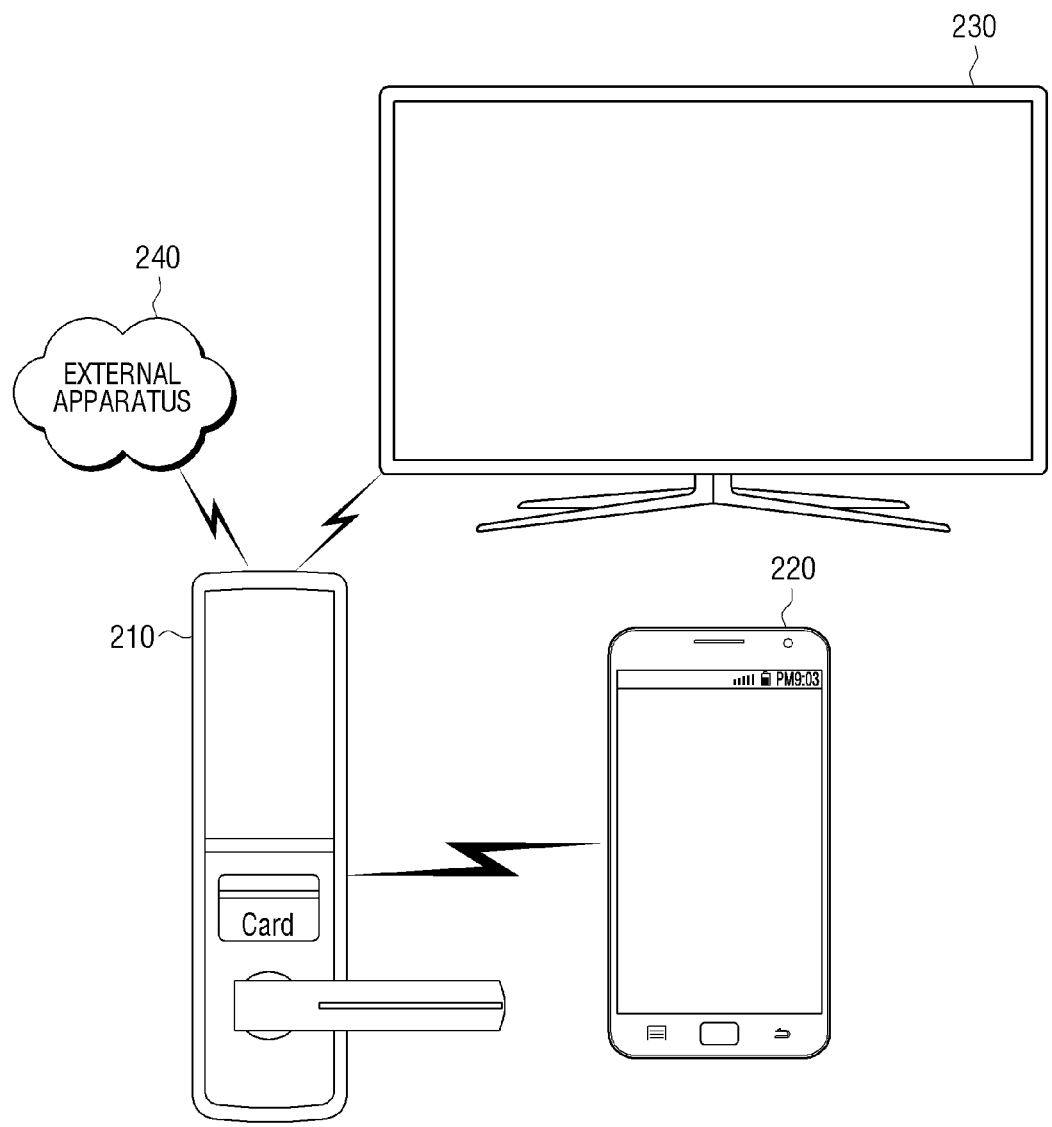
FIG. 2 is a view for explaining operations of a door lock apparatus according to an exemplary embodiment.

FIG. 2 is a view for explaining operations of a door lock apparatus according to an exemplary embodiment.

Referring to FIG. 2, when a mobile device 220 including an NFC chip for performing the authentication when being tagged with a door lock apparatus 210 approaches within a predetermined range, the controller 140 of the door lock apparatus 210 performs the authentication for opening a door, and when the authentication is performed, may receive status information on each of a plurality of external apparatuses 240 from the plurality of external apparatuses 240.

In addition, the controller 140 of the door lock apparatus 210 may control to transmit the received status information to a display apparatus 230 and display the transmitted status information.

For example, when a user brings the mobile device 220 including an NFC chip for performing authentication by being tagged with the door lock apparatus 210 within a predetermined range of the door lock apparatus 210 in order to enter a house, the controller 140 performs the authentication for opening a door, and may receive information on electricity consumption amount measured by an electricity meter.

In addition, the controller 140 may control to transmit the information on the electricity consumption amount received from the electricity meter and display the information. Thus, the user is able to know the electricity consumption amount as shown in the electricity meter through the display apparatus 230 without checking the electricity meter.

The display apparatus 230 may be the mobile device 220 including an NFC chip for performing the authentication by being tagged with the door lock apparatus 210. In this case, the mobile device 220 may perform the authentication with the door lock apparatus 230, and receive and display the status information on each of a plurality of external apparatuses from the door lock apparatus 230 after the authentication is performed. Those operations will be described in detail by referring to FIG. 3.

Figure 3:
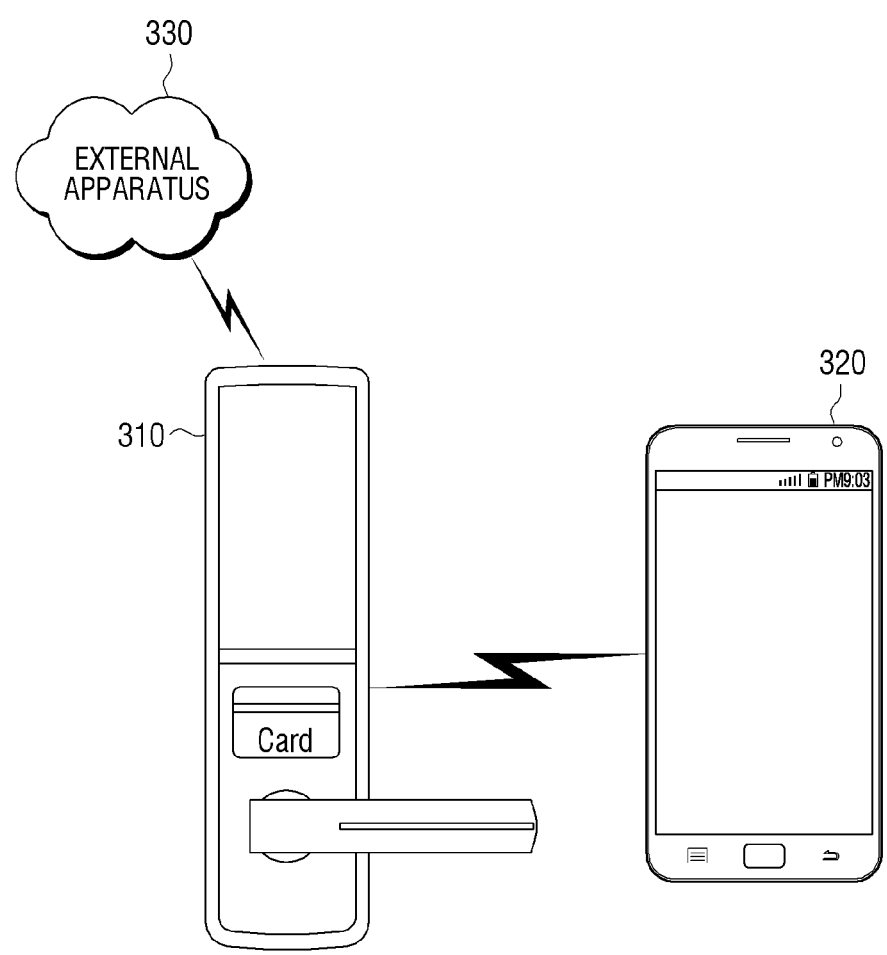
FIG. 3 is a view for explaining operations of a mobile device according to an exemplary embodiment.

FIG. 3 is a view for explaining operations of a mobile device according to an exemplary embodiment.

Referring to FIG. 3, when a mobile device 320 including an NFC chip for performing the authentication by being tagged with a door lock apparatus 310 approaches within a predetermined range, the controller 140 of the door lock apparatus 310 may perform the authentication for opening a door, and when the authentication is performed, may receive the status information on each of a plurality of external apparatuses 330 from the plurality of external apparatuses 330.

In addition, the controller 140 of the door lock apparatus 310 may control to transmit the received status information to the mobile device and display the received status information.

That is, a user is able to perform the authentication by tagging the mobile device 320 with the door lock apparatus 310, and when the authentication is performed, is able to check the status of each of the plurality of external apparatuses 330 through a screen of the mobile device 320.

Although the aforementioned exemplary embodiment was described by taking the mobile device 320 including the NFC chip for performing the authentication by being tagged with the door lock apparatus 310 as an example, a card where the NFC chip is embedded may be separated from the mobile device 320.

That is, the user is able to perform the authentication by tagging the mobile device 320 with the door lock apparatus 310 by using a card where the NFC chip is embedded, and when the authentication is performed, the controller 140 of the door lock apparatus 310 may control to transmit the status information on each of the plurality of apparatuses to the mobile device 320 and display the status information.

In addition, the door lock apparatus 310 may further include a plurality of keys. Hence, when an authentication number is input through the plurality of keys, the near field communication unit 120 may perform the authentication by comparing the input authentication number and a pre-stored authentication number.

For example, when a user inputs an authentication number by using the plurality of keys mounted on the door lock apparatus 310 without performing the authentication by tagging the mobile device with the door lock apparatus by using the card where the NFC chip is embedded, the controller 140 of the door lock apparatus 310 may perform the authentication by comparing the authentication number input through the plurality of keys and the pre-stored authentication number, and when the authentication is performed, may control to receive the status information on each of the plurality of external apparatuses 330 from the plurality of external apparatuses 330 as specified above, transmit the received status information to the display apparatus 230 or the mobile device 320 and display the status information.

Hence, when a door lock apparatus is equipped with both of a near field communication unit which performs the authentication by a tagging operation and a plurality of keys, a user is able to perform the authentication selectively, and when the authentication is performed, the user is able to check the status of each of a plurality of external apparatuses through a display apparatus or a mobile device.

The plurality of external apparatuses 330 may include at least one of a first external apparatus which is disposed in an external environment of a space defined by a door where a door lock apparatus is mounted and a second external apparatus which is disposed in an internal environment of the space. Those external apparatuses will be described in detail by referring to FIG. 4.

Figure 4:
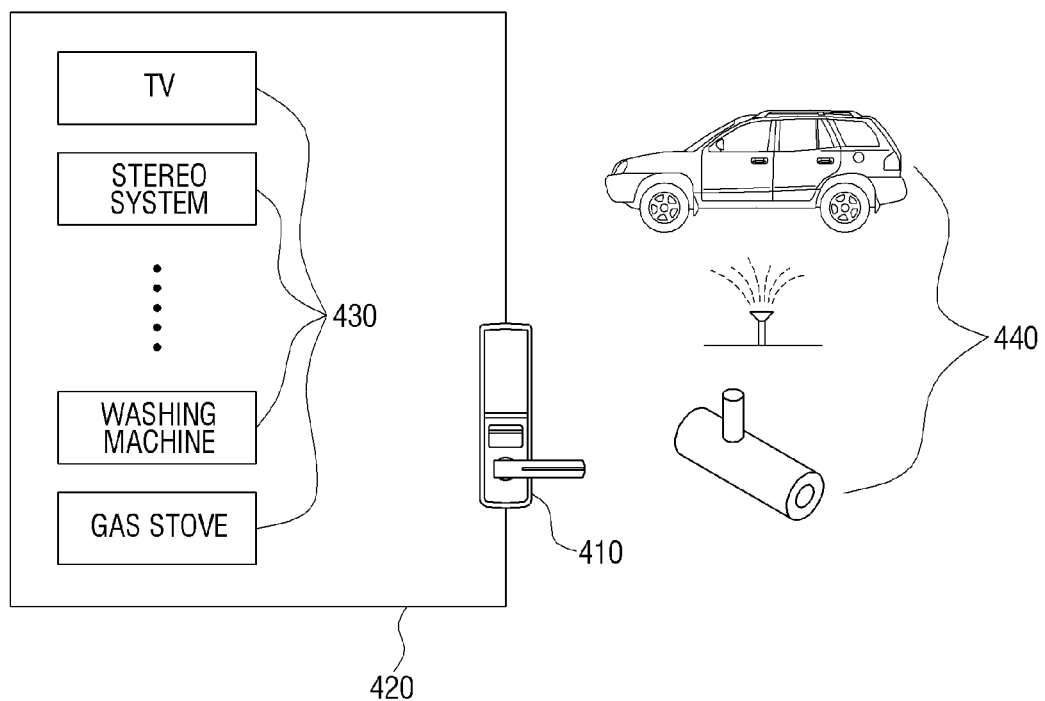
FIG. 4 is a view of a plurality of external apparatuses according to an exemplary embodiment.

FIG. 4 is a view of a plurality of external apparatuses according to an exemplary embodiment.

Referring to FIG. 4, a space 420 defined by a door 410 where a door lock apparatus is mounted may refer to an internal space of a house.

In addition, an external environment of the space 420 defined by the door 410 where a door lock apparatus may refer to an external space of a house.

Accordingly, a plurality of external apparatuses 430 which are located in the space 420 defined by the door 410 where a door lock apparatus is mounted, that is, an internal space of a house is a second external apparatus, and a plurality of external apparatuses 440 which are located in an external environment of the space 420 defined by the door 410 where a door lock apparatus is mounted, that is, an external space of the house is a first external apparatus.

As shown in FIG. 4, a plurality of external apparatuses 430 which are located in the internal space of a house, that is, the second external apparatus may be a TV, a stereo system, a washing machine, a gas stove, etc., and a plurality of external apparatuses 440 which are located in the external space of a house, that is, the first external apparatus may be a car, a sprinkler, a closed circuit television (CCTV), etc.

Herein, a display apparatus which receives the status information on the plurality of external apparatuses 430 and 440 from the door lock apparatus and displays the received status information may be an apparatus which is disposed in the internal environment of the space 420 defined by the door 410 where the door lock apparatus is mounted.

For example, in FIG. 4, the display apparatus which receives the status information on the plurality of external apparatuses 430 and 440 from the door lock apparatus and displays the received status information may be a TV.

When the display apparatus is a TV, a user is able to perform the authentication by using an NFC card or by inputting an authentication number through the plurality of keys mounted on the door lock apparatus, and the TV may receive the status information on each of the plurality of external apparatuses 430 and 440 from the door lock apparatus. When the received status information is transmitted to the TV, the TV may display the status of each of the plurality of external apparatuses.

Herein, the display apparatus was described by taking a TV as an example, but not limited thereto, the display apparatus according to an exemplary embodiment may be implemented as an electronic apparatus which is capable of displaying the status of each of a plurality of external apparatuses based on the received status information.

In addition, although not illustrated in FIG. 4, the display apparatus which receives the status information on the plurality of external apparatuses 430 and 440 from the door lock apparatus and displays the received status information may be a mobile device.

When the authentication is performed, the controller 140 may request for the status information to each of the plurality of external apparatuses and receive the status information.

To be specific, the controller 140 may perform the authentication by recognizing an NFC card in the mobile device through the near field communication with the mobile device, or when the authentication is performed through the authentication number input by the plurality of keys mounted on the door lock apparatus 100, the controller 140 may request for the status information to each of the plurality of external apparatuses, and receive the status information from each of the plurality of external apparatuses.

Herein, the controller 140 may request for the status information to each of the plurality of external apparatuses and receive the status information only after the authentication is performed by the near field communication unit 120. At this time, the controller 140 may control to transmit the received status information to the display apparatus or the mobile device and display the transmitted status information.

For example, when the near field communication unit 120 recognizes the NFC card in the mobile device, an authentication condition is satisfied, and the authentication is performed, the controller 140 may transmit a signal to request for the status information on each of the plurality of external apparatuses by a confirmation signal which shows that the authentication condition is satisfied triggering the first interface.

In addition, the door lock apparatus 100 may further include a storage configured to store the status information. Such configuration of the door lock apparatus 100 will be described by referring to FIG. 5.

Figure 5:
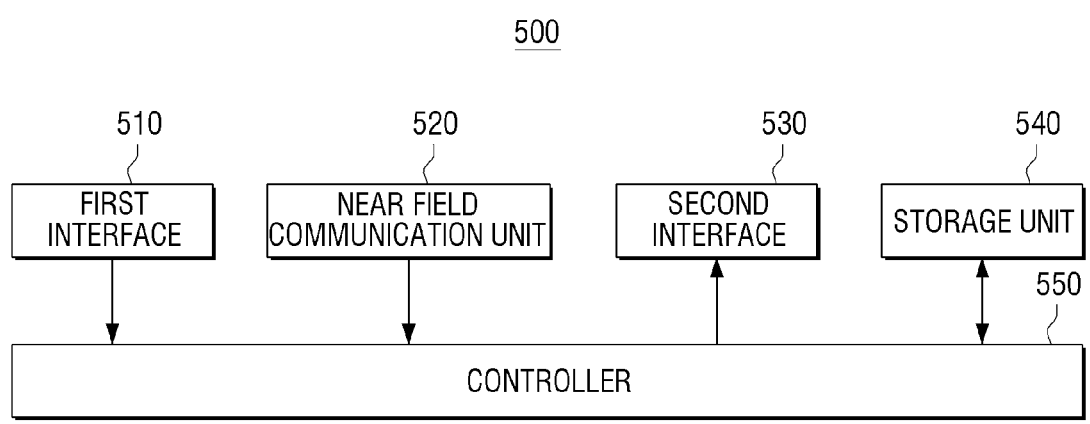
FIG. 5 is a block diagram of a structure of a door lock apparatus according to an exemplary embodiment.

FIG. 5 is a block diagram of a structure of a door lock apparatus according to an exemplary embodiment.

Referring to FIG. 5, a door lock apparatus 500 may include a first interface 510, a near field communication unit 520, a second interface 530, a storage 540, and a controller 550.

The first interface 510, the near field communication unit 520, the second interface 530, and the controller 550 were described above, and thus, the detailed description is omitted.

When the door lock apparatus 500 includes the storage 540, the controller 550 may receive the status information from a plurality of external apparatuses at a predetermined time interval and store the received status information in the storage 540.

To be specific, the controller 550 may update the status information by receiving the status information from the plurality of external apparatuses at a predetermined time interval and storing the status information in the storage 540 even when the authentication is not performed in the near field communication unit 520.

In this case, the user is able to see the status of each of the plurality of external apparatuses by receiving the status of each of the plurality of external apparatuses, which is updated to the storage 540 through the communication between the mobile device and the door lock apparatus 500 without performing the authentication.

In addition, in case of updating the status information by receiving the status information from the plurality of external apparatuses and storing the status information in the storage 540, when the near field communication unit 520 performs the authentication, the controller 550 may receive the status information by requesting for the status information to each of the plurality of external apparatuses.

The plurality of external apparatuses may include at least one of a car, an electricity meter, a sprinkler, an air-conditional and heating system, and a home appliance. That is, the plurality of external apparatuses may include all of the external apparatuses which are disposed in outside and inside of a house.

In addition, the status information may be information which represents at least one of a car status, a measured electricity consumption amount, an operating status of the sprinkler, an operating status of the air-conditioning and heating system, and an operating status of the home appliance.

Figure 6:
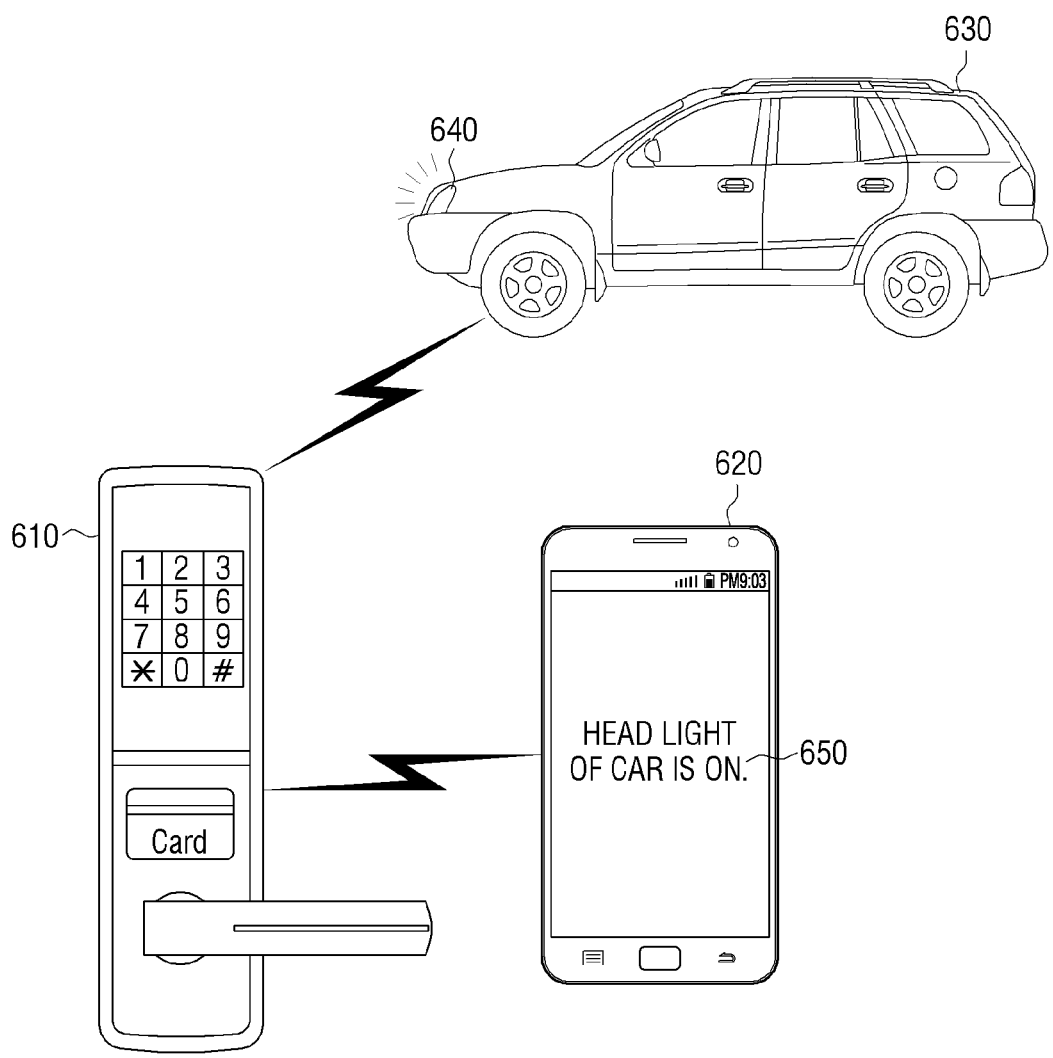
FIGS. 6 to 8 are views for explaining various exemplary embodiments of the present disclosure.

For example, as illustrated in FIG. 6, when one of the plurality of external apparatuses is a car 630, and the user performs the authentication for opening a door with respect to the door lock apparatus 610 in order to enter a house after parking the car 630 without turning off a headlight 640 or an engine of the car, the controller 140 may control to receive information on the status when the headlight 640 or the engine of the car 630 is on from the car 630, and to display the information which shows the status of the headlight 630 or the engine of the car 630 through a TV or a screen 650 of the mobile device 620.

Figure 7:
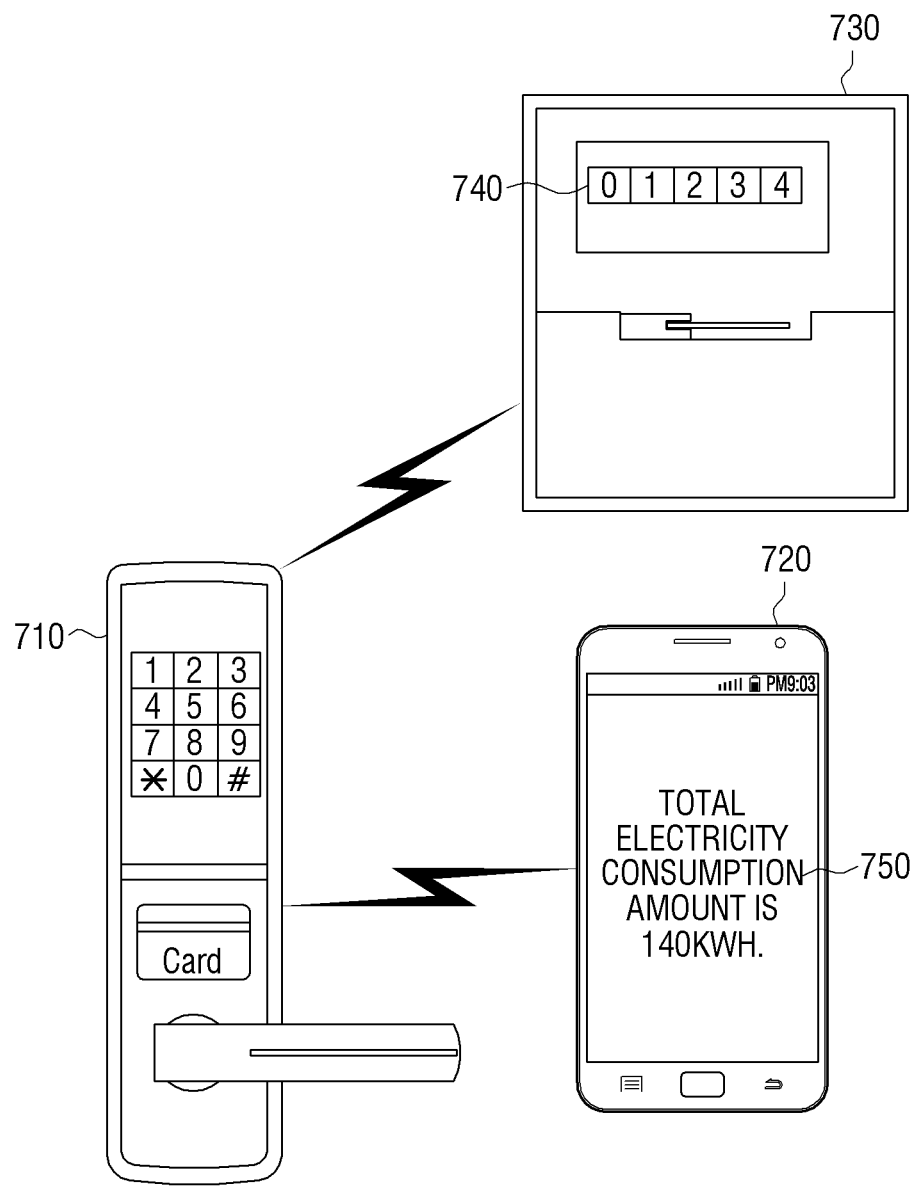

In addition, as illustrated in FIG. 7, when one of the plurality of external apparatuses is an electricity meter 730, and the user performs the authentication for opening a door with respect to a door lock apparatus 710 in order to enter the house, the controller 140 may control to receive information on accumulated measured electricity consumption amount 740 measured by the electricity meter 730, and display the currently accumulated measured electricity consumption amount through a TV or a screen 750 of a mobile device 720.

Figure 8:
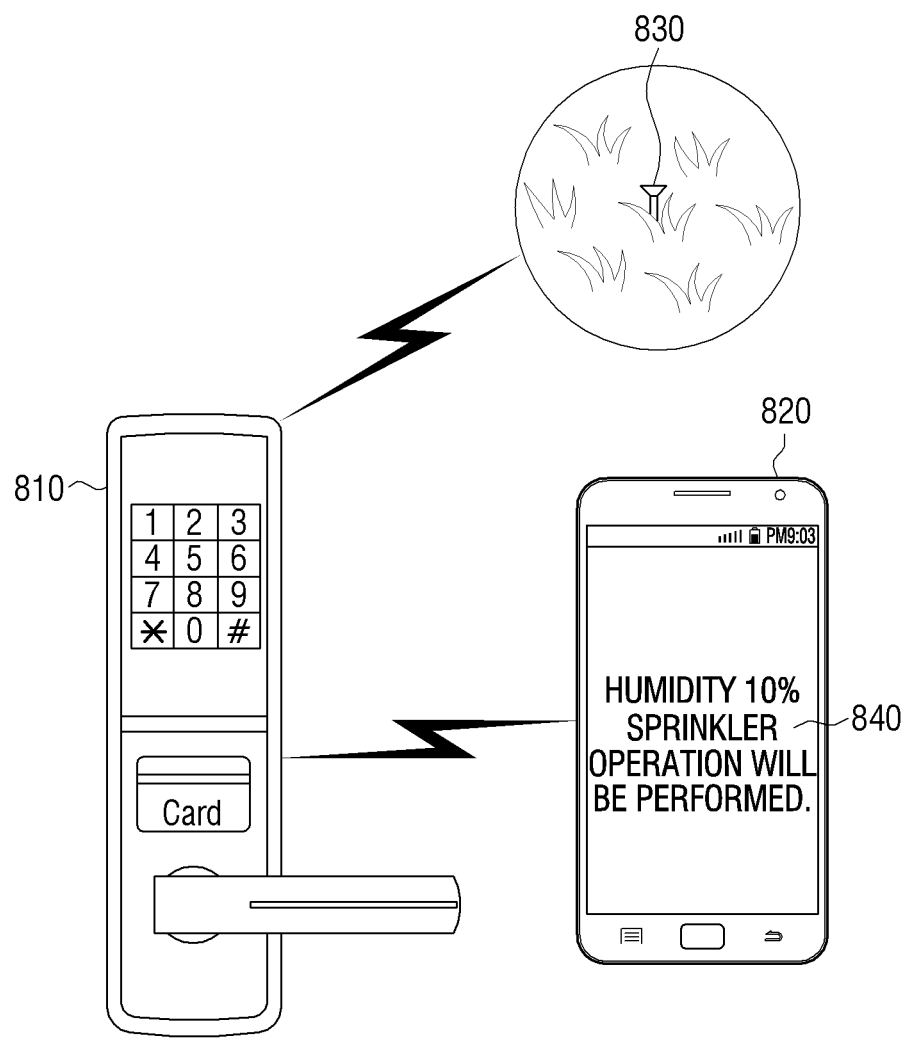

In addition, as illustrated in FIG. 8, when one of the plurality of external apparatuses is a sprinkler 830, and the user performs the authentication for opening a door with respect to a door lock apparatus 810 in order to enter the house, the controller 140 may control to receive humidity which is measured by a humidity measuring sensor (not shown) mounted on the sprinkler 830 and information on an operating status of the sprinkler 830 according to the measured humidity, and display the measured humidity and the operating status of the sprinkler 830 through a TV or a screen 840 of a mobile device 820.

In particular, when one of the plurality of external apparatuses is the sprinkler 830, the sprinkler 830 is an apparatus which should operate when a user is in the house. Thus, when the user performs the authentication for opening a door, the door lock apparatus 810 may transmit information which shows that the user is in the house to the sprinkler 830, and receive the measured humidity and information on the operating status of the sprinkler 830 according to the measured humidity from the sprinkler 830.

That is, the controller 140 of the door lock apparatus 810 may determine whether a user is in the house or not according to the execution status of the authentication of the near field communication unit 120, and may request for the status information to the plurality of external apparatuses while transmitting the determined information to the plurality of external apparatuses.

Hence, the plurality of external apparatuses may be set to transmit only the information which is required when the user is in the house according to a condition which is predetermined by the user, and thus, the user is able to see only the information which is set to be displayed when the user is in the house through a display apparatus or a mobile device.

When one of the plurality of external apparatuses is an air-conditioning apparatus or a home appliance, the controller 140 may operate in the same manner of the aforementioned exemplary embodiment.

Figure 9:
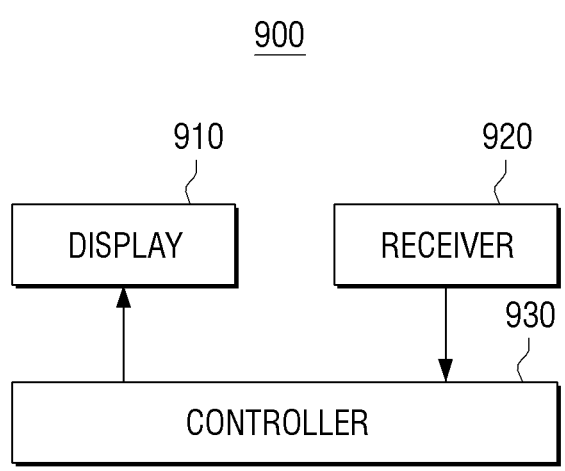
FIG. 9 is a block diagram illustrating a structure of a display apparatus according to an exemplary embodiment.

FIG. 9 is a block diagram illustrating a structure of a display apparatus according to an exemplary embodiment.

Referring to FIG. 9, a display apparatus 900 may include a display 910, a receiver 920, and a controller 930.

The display 910 may display the status of each of a plurality of external apparatuses based on the received status information on each of the plurality of external apparatuses.

A method of displaying the status of each of the plurality of external apparatuses on the display 910 may be set by a user.

Figure 10:
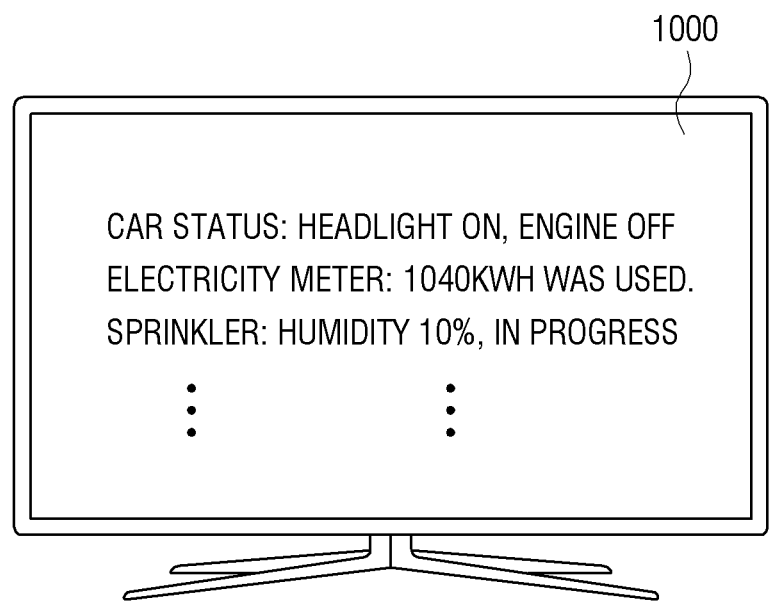
FIGS. 10 to 11 are views for explaining a displaying method of a display according to an exemplary embodiment.

For example, as illustrated in FIG. 10, a display 1000 may list and display the status information of all of the plurality of external apparatuses in order based on the status information of each of the plurality of external apparatuses, which were received from the door lock apparatus.

Figure 11:
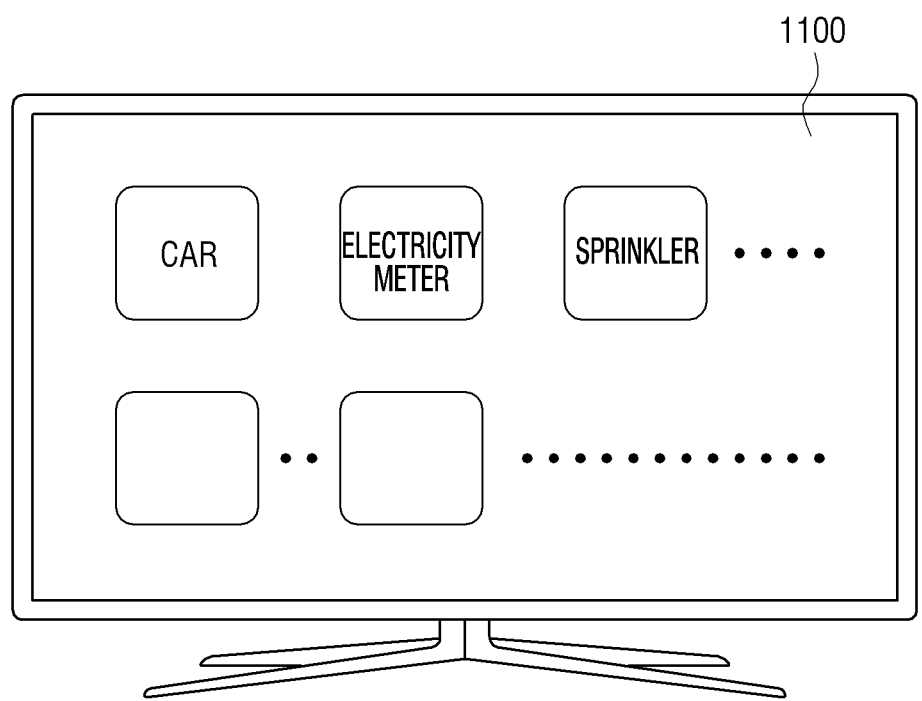

Alternatively, as illustrated in FIG. 11, a display 1100 may display an icon for each of the plurality of external apparatuses based on the status information on the plurality of external apparatuses received from the door lock apparatus so that the user is able to select an icon and see the status of the external apparatus corresponding to the selected icon.

The receiver 920 may receive the status information on each of the plurality of external apparatuses.

Herein, the receiver 920 may receive the status information on each of the plurality of external apparatuses from the door lock apparatus 100 by communicating with the door lock apparatus 100.

In addition, the receiver 920 may perform the network communication by using various communication methods. To be specific, the first interface 110 may perform the network communication by using various communication methods such as a wired/wireless Local Area Network (LAN), Wi-Fi, a Wide Area Network (WAN), Ethernet, Bluetooth, Zigbee, a Universal Serial Bus (USB), IEEE 1394, etc. For doing so, the first interface 110 may be equipped with various communication modules for performing the network communication according to each communication method.

When the authentication for opening a door is performed in the door lock apparatus 100, the controller 930 may control to display the received status information on the display 910.

To be specific, when the authentication for opening a door is performed in the door lock apparatus 100, the controller 930 may receive the status information on each of the plurality of external apparatuses from the door lock apparatus 100 by communicating with the door lock apparatus 100, and may display the status of each of the plurality of external apparatuses on the display 910 based on the received status information.

The method of displaying the status of the each of the plurality of external apparatuses was described above, and thus, the detailed description is omitted.

In addition, when the authentication for opening a door is performed during the execution of other job, the controller 930 may control to display the received status information on the display 910 for a predetermined time, and when the predetermined time elapses, to perform the original job again.

For example, when the display apparatus 910 is a TV, and the authentication for opening a door is performed in the door lock apparatus while a moving image play back function is executed, the controller 930 may receive the status information on each of the plurality of external apparatuses, display the received status information on the display 910 for the predetermined time, and when the predetermined time elapses, perform the moving image play back function again by converting a screen.

In addition, when the user sets to keep executing the original job, even though the authentication for opening a door is performed and the status information on each of the plurality of external apparatuses is received from the door lock apparatus 100 according to a user setting, the controller 930 may control to keep executing the original job without displaying the received status information on the display 910.

Figure 12:
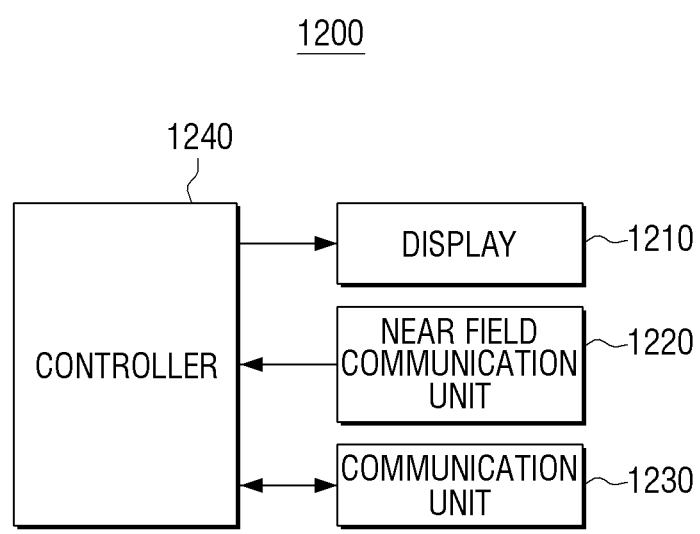
FIG. 12 is a block diagram illustrating a structure of a mobile device according to an exemplary embodiment.

FIG. 12 is a block diagram illustrating a structure of a mobile device according to an exemplary embodiment.

Referring to FIG. 12, a mobile device 1200 may include a display 1210, a near field communication unit 1220 (e.g., a near field communicator), a communication unit 1230 (e.g., a communicator), and a controller 1240.

The display 1210 operates in the same manner of the display 910 of the display apparatus 900 explained in connection with FIG. 9, and thus, the detailed description is omitted.

The near field communication unit 1220 may perform the authentication when being tagged with the door lock apparatus 100. That is, the near field communication unit 1220 is provided with an NFC chip, and thus, when the near field communication unit 1220 approaches within a predetermined range of the door lock apparatus 100, the near field communication unit 120 is tagged with the near field communication unit of the door lock apparatus 100, thereby performing the authentication for opening a door.

When the authentication is performed, the communication unit 1230 may receive the status information on the plurality of external apparatuses from the door lock apparatus 100. Herein, the communication unit 1230 may perform the network communication by using various communication methods as explained above.

When the status information is received, the controller 1240 may display the status information on the display 1210.

Herein, the method of displaying the status of each of the plurality of external apparatuses on the display 1210 was described above, and thus, the detailed description is omitted.

In addition, when the controller 1240 is tagged with the door lock apparatus 100 while executing the original job and the authentication is performed, the controller 1240 may control to perform the original job again after a predetermined time elapses.

For example, when the mobile device 1200 is tagged with the door lock apparatus 100 while executing a call function, and the authentication is performed, the controller 1240 may receive the status information on each of the plurality of external apparatuses from the door lock apparatus 100 and display the status information on the display 1210 for a predetermined time, and when the predetermined time elapses, may perform the call function again by converting a screen.

In addition, the controller 1240 may display the received status of each of the plurality of external apparatuses on the display 1210 while performing the call function.

In addition, when the user sets to keep executing the original job, even though the controller 1240 performs the authentication by being tagged with the door lock apparatus 100 and the status information on each of the plurality of external apparatuses are received from the door lock apparatus 100 according to a user setting, the controller 1240 may control to keep executing the original job without displaying the status information on the display 1210.

Figure 13:
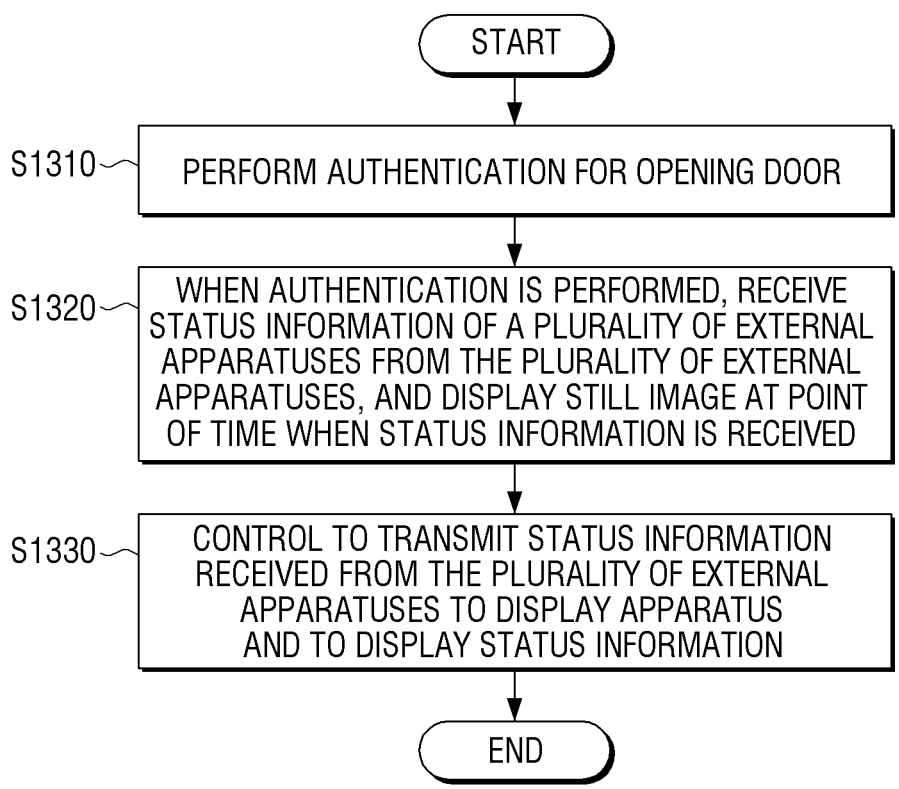
FIG. 13 is a flow chart for explaining a method for controlling a door lock apparatus according to an exemplary embodiment.

FIG. 13 is a flow chart for explaining a method for controlling a door lock apparatus according to an exemplary embodiment.

Referring to FIG. 13, the door lock apparatus may perform the authentication for opening a door (S1310).

Herein, the performing the authentication may include performing the authentication by recognizing a tag within a mobile device by performing the near field communication with the mobile device.

In addition, the performing the authentication may include, when an authentication number is input through a plurality of keys mounted on the door lock apparatus, performing the authentication by comparing the input authentication number and a pre-stored authentication number.

When the authentication is performed, the door lock apparatus may receive the status information on each of the plurality of external apparatuses from the plurality of external apparatuses (S1320).

Herein, when the authentication is performed, the door lock apparatus may request for and receive the status information from each of the plurality of external apparatuses.

In addition, the door lock apparatus may receive the status information from the plurality of external apparatuses at a predetermined time interval, store the status information.

In addition, the door lock apparatus may control to transmit the status information received from each of the plurality of external apparatuses and display the status information (S1330).

Herein, a display apparatus may be a mobile device.

In addition, a plurality of external apparatuses may include at least one of a first external apparatus which is disposed in an external environment of a space defined by a door to which the door lock apparatus is mounted and a second external apparatus which is disposed in an internal environment of the space. In addition, the display apparatus may be an apparatus which is disposed in the internal environment of the space.

Herein, the plurality of external apparatuses may include at least one of a car, an electricity meter, a sprinkler, an air conditioning and heating system, and a home appliance. In addition, the status information may be information which represents at least one of a car status, a measured electricity consumption amount, an operating status of the sprinkler, an operating status of the air-conditioning and heating system, and an operating status of the home appliance.

Figure 14:
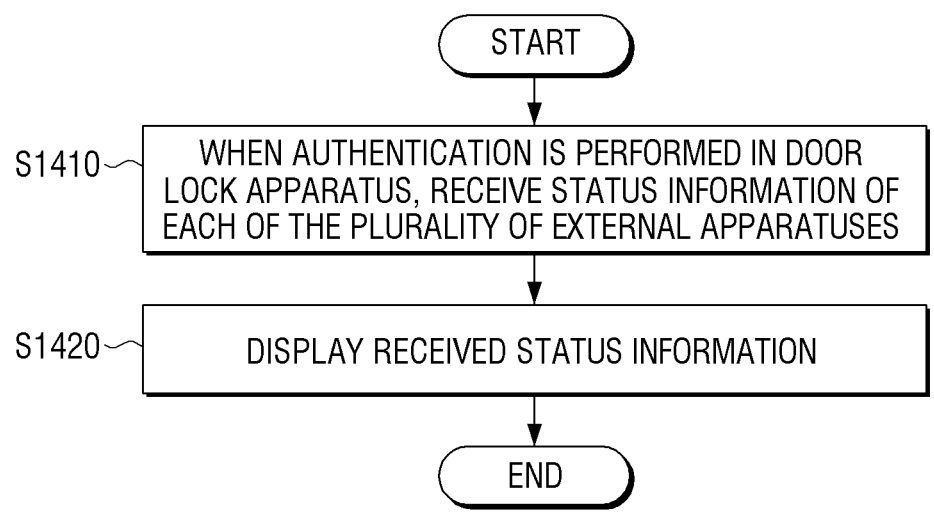
FIG. 14 is a flow chart for explaining a method for controlling a display apparatus which is disposed within a space defined by a door lock apparatus according to an exemplary embodiment.

FIG. 14 is a flow chart for explaining a method for controlling a display apparatus which is disposed within a space defined by a door lock apparatus according to an exemplary embodiment.

Referring to FIG. 14, when the authentication for opening a door is performed in a door lock apparatus, the display apparatus may receive the status information on each of the plurality of external apparatuses (S1410).

In addition, the display apparatus may display the received status information (S1420).

Figure 15:
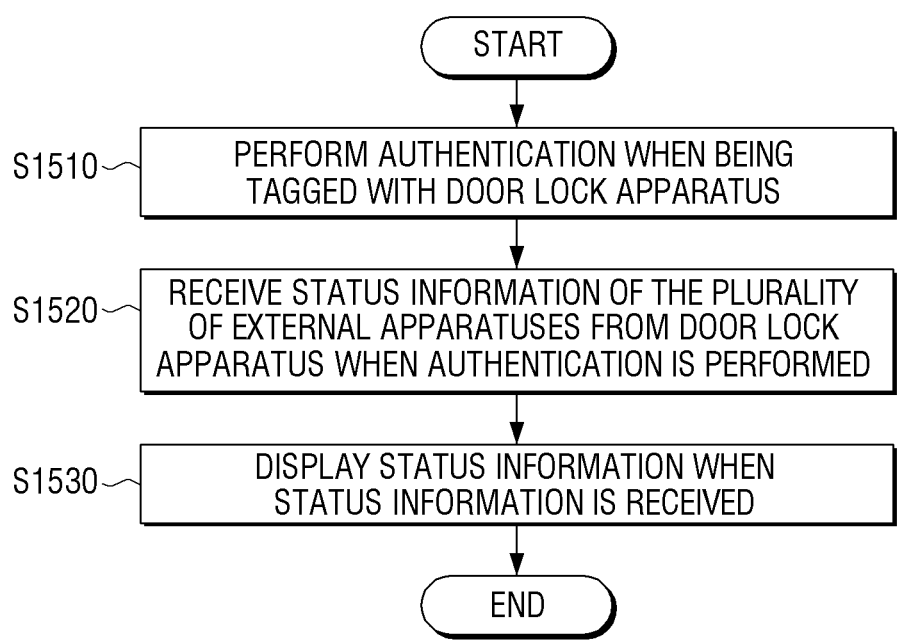
FIG. 15 is a flow chart for explaining a method for controlling a mobile device according to an exemplary embodiment.

FIG. 15 is a flow chart for explaining a method for controlling a mobile device according to an exemplary embodiment.

Referring to FIG. 15, a mobile device may perform the authentication when being tagged with a door lock apparatus (S1510).

In addition, when the authentication is performed, the mobile device may receive the status information of the plurality of external apparatuses from a door lock apparatus (S1520).

When the status information is received, the mobile device may display the status information (S1530).

In addition, a non-transitory computer readable medium including a program which sequentially performs the controlling methods according to the present disclosure may be provided.

For example, a non-transitory computer readable medium including a program which performs the authentication for opening a door, a process of receiving the status information of each of a plurality of external apparatuses from the plurality of external apparatuses when the authentication is performed, and a process of controlling to transmit the status information received from each of the plurality of external apparatuses to a display apparatus and to display the status information may be provided.

According to another example, a non-transitory computer readable medium including a program, when the authentication for opening a door is performed in a door lock apparatus, which performs a process of receiving the status information of each of the plurality of external apparatuses and a process of displaying the received status information may be provided.

According to yet another example, a non-transitory computer readable medium including a program which performs the authentication process when being tagged with the door lock apparatus, a process of receiving the status information of the plurality of external apparatuses from the door lock apparatus when the authentication is performed, and a process of displaying the received status information may be provided.

The non-transitory computer readable medium may be a medium that stores data for a short period, such as a register, a cache, or a memory, or means a medium which semi-permanently stores data and is readable by a device. To be specific, various applications and programs as described above may be stored and provided in the non-transitory computer readable medium, such as a compact disc (CD), a digital versatile disk (DVD), a hard disk, a Blu-ray disk, a universal serial bus (USB), a memory card, and a read-only memory (ROM), and the like.

In addition, although a bus is not shown in the block diagrams illustrating a display apparatus and a remote controller, the communication between each component of the door lock apparatus, the display apparatus, and the mobile device may be performed through the bus. In addition, each device may further include a processor such as a Central Processing Unit (CPU) and a microprocessor which perform the aforementioned various operations.

According to the aforementioned various exemplary embodiments, a door lock apparatus may facilitate communication between outside and inside of a house by performing a function of a relay station, and thus, a user is able to check status of a plurality of external apparatuses efficiently.

Although a few desirable exemplary embodiments have been shown and described, the present disclosure is not limited to the aforementioned particular exemplary embodiments, and could be variously modified and achieved by those skilled in the art to which the present disclosure pertains without deviating from the substance of the present disclosure which is claimed in the claims, and such modifications should not be understood separately from the technical concept or prospect of the present disclosure.

What is claimed is:

1. A door lock apparatus mounted on a door, the apparatus comprising:
   a first interface configured to communicate with a plurality of external apparatuses;
   a near field communicator configured to perform authentication for opening the door from an outside of a space defined by the door;
   a second interface configured to communicate with a display apparatus; and
   a controller configured to control the first interface to receive status information on each of the plurality of external apparatuses from the plurality of external apparatuses, and in response to the authentication being performed by the near field communicator, control the second interface to transmit the received status information to the display apparatus to be displayed by the display apparatus.

2. The door lock apparatus as claimed in claim 1, wherein the near field communicator is configured to perform the authentication by performing near field communication with a mobile device and recognize a tag within the mobile device.

3. The door lock apparatus as claimed in claim 2, wherein the display apparatus is the mobile device.

4. The door lock apparatus as claimed in claim 1 further comprising:
   a plurality of keys mounted on the door lock apparatus, wherein in response to an authentication number being input through the plurality of keys, the near field communicator performs the authentication by comparing the input authentication number and a pre-stored authentication number.

5. The door lock apparatus as claimed in claim 1,
   wherein the plurality of external apparatuses comprise at least one of a first external apparatus which is disposed in an external environment of the space and a second external apparatus which is disposed in an internal environment of the space, and
   wherein the display apparatus is an apparatus which is disposed in the internal environment of the space.

6. The door lock apparatus as claimed in claim 1, wherein in response to the authentication being performed, the controller is configured to control the first interface to request and receive the status information from each of the plurality of external apparatuses.

7. The door lock apparatus as claimed in claim 1, further comprising:
a storage configured to store the status information,
wherein the controller is configured to control the first interface to receive the status information from the plurality of external apparatuses at a predetermined time interval, and store the received status information in the storage.

8. The door lock apparatus as claimed in claim 1, wherein the plurality of external apparatuses comprise at least one of a car, an electricity meter, a sprinkler, an air-conditioning and heating system, and a home appliance, and
wherein the status information is information which represents at least one of a car status, a measured electricity consumption amount, an operating status of the sprinkler, an operating status of the air-conditioning and heating system, and an operating status of the home appliance.

9. A display apparatus disposed within a space defined by a door, the display apparatus comprising:
a display;
a receiver configured to receive status information on each of a plurality of external apparatuses; and
a controller configured to control to display the received status information on the display in response to authentication for opening a door from an outside of the space being performed in a door lock apparatus mounted on the door.

10. A mobile device comprising:
a display;
a near field communicator configured to perform authentication in response to being tagged with a door lock apparatus mounted on a door;
a communicator configured to receive status information on each of a plurality of external apparatuses from the door lock apparatus in response to the authentication for opening the door from an outside of a space defined by the door being performed; and
a controller configured to control the display to display the status information in response to the status information being received.

11. A method for controlling a door lock apparatus mounted on a door, the method comprising:
performing authentication for opening the door from an outside of a space defined by the door;
receiving status information on each of a plurality of external apparatuses from the plurality of external apparatuses in response to the authentication being performed; and
transmitting the status information received from each of the plurality of external apparatuses to a display to be displayed by the display.

12. The method as claimed in claim 11, wherein the performing the authentication comprises performing the authentication by performing near field communication with a mobile device and recognizing a tag within the mobile device.

13. The method as claimed in claim 12, wherein the display is part of the mobile device.

14. The method as claimed in claim 11,
wherein the performing the authentication comprises, in response to an authentication number being input through a plurality of keys which mounted on the door lock apparatus are mounted on the door lock apparatus, performing the authentication by comparing the input authentication number and a pre-stored authentication number.

15. The method as claimed in claim 11, wherein the plurality of external apparatuses comprise at least one of a first external apparatus which is disposed in an external environment of a space defined by a door to which the door lock apparatus is mounted and a second external apparatus which is disposed in an internal environment of the space, and
wherein the display apparatus is an apparatus which is disposed in the internal environment of the space.

16. The method as claimed in claim 11, wherein the receiving the status information on each of a plurality of external apparatuses from the plurality of external apparatuses comprises, in response to the authentication being performed, requesting the status information from each of the plurality of external apparatuses and receiving the status information.

17. The method as claimed in claim 11 further comprising:
receiving the status information from the plurality of external apparatuses at a predetermined time interval and storing the status information.

18. The method as claimed in claim 11, wherein the plurality of external apparatuses comprise at least one of a car, an electricity meter, a sprinkler, an air-conditioning and heating system, and a home appliance, and
wherein the status information is information which represents at least one of a car status, a measured electricity consumption amount, an operating status of the sprinkler, an operating status of the air-conditioning and heating system, and an operating status of the home appliance.

19. A method for controlling a display apparatus disposed within a space defined by a door, the method comprising:
receiving status information on each of a plurality of external apparatuses in response to authentication for opening the door from an outside of the space being performed in the door lock apparatus mounted on the door; and
displaying the received status information.

20. A method for controlling a mobile device, the method comprising:
performing authentication for opening a door from an outside of a space defined by the door, in response to being tagged with a door lock apparatus mounted on the door;
receiving status information on each of a plurality of external apparatuses from the door lock apparatus in response to the authentication being performed; and
displaying the status information in response to the status information being received.

21. A door lock apparatus mounted on a door, the apparatus comprising:
a first interface configured to communicate with a plurality of external apparatuses;
a second interface configured to communicate with a display apparatus; and
a controller configured to control the first interface to receive status information on each of the plurality of external apparatuses from the plurality of external apparatuses, and control the second interface to transmit the received status information to the display apparatus in response to authentication for opening the door from an outside of a space defined by the door being performed.

22. The door lock apparatus as claimed in claim 21, further comprising:
  a near field communicator,
    wherein controller is configured to perform the authentication by controlling the near field communicator to perform near field communication with a mobile device and recognize a tag within the mobile device.

23. The door lock apparatus as claimed in claim 21, wherein the display apparatus is the mobile device.

24. The door lock apparatus as claimed in claim 21 further comprising:
  a plurality of keys mounted on the door lock apparatus,
    wherein controller is configured to perform the authentication by receiving an authentication number that is input through the plurality of keys.

\* \* \* \* \*